US008762132B2

(12) United States Patent
Tsuchida et al.

(10) Patent No.: US 8,762,132 B2
(45) Date of Patent: Jun. 24, 2014

(54) TEXTUAL ENTAILMENT RECOGNITION APPARATUS, TEXTUAL ENTAILMENT RECOGNITION METHOD, AND COMPUTER-READABLE RECORDING MEDIUM

(71) Applicants: Masaaki Tsuchida, Tokyo (JP); Kai Ishikawa, Tokyo (JP); Takashi Onishi, Tokyo (JP)

(72) Inventors: Masaaki Tsuchida, Tokyo (JP); Kai Ishikawa, Tokyo (JP); Takashi Onishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/823,546

(22) PCT Filed: Oct. 4, 2012

(86) PCT No.: PCT/JP2012/075765
§ 371 (c)(1),
(2), (4) Date: Mar. 14, 2013

(87) PCT Pub. No.: WO2013/058118
PCT Pub. Date: Apr. 25, 2013

(65) Prior Publication Data
US 2013/0204611 A1   Aug. 8, 2013

(30) Foreign Application Priority Data
Oct. 20, 2011  (JP) .................................. 2011-230773

(51) Int. Cl.
*G06F 17/27* (2006.01)
(52) U.S. Cl.
USPC .......................................................... 704/9

(58) Field of Classification Search
None
See application file for complete search history.

(56) References Cited

U.S. PATENT DOCUMENTS

| | | | |
|---|---|---|---|
| 7,890,539 B2 * | 2/2011 | Boschee et al. | 707/794 |
| 8,180,633 B2 * | 5/2012 | Collobert et al. | 704/232 |
| 8,392,436 B2 * | 3/2013 | Bai et al. | 707/758 |
| 8,554,542 B2 * | 10/2013 | Sandor et al. | 704/9 |
| 2006/0245641 A1 * | 11/2006 | Viola et al. | 382/155 |
| 2011/0119050 A1 * | 5/2011 | Deschacht et al. | 704/9 |

FOREIGN PATENT DOCUMENTS

| | | |
|---|---|---|
| JP | 2004-272352 A | 9/2004 |
| JP | 9-128401 | 5/2007 |

OTHER PUBLICATIONS

Moschitti, Alessandro, and Cosmin Adrian Bejan. "A semantic kernel for predicate argument classification." CoNLL-2004. 2004.*

(Continued)

*Primary Examiner* — Brian Albertalli
(74) *Attorney, Agent, or Firm* — Foley & Lardner LLP (57) ABSTRACT

A textual entailment recognition apparatus (2) includes a vector generation unit (21) that generates, for each of first and second texts, a vector for each predicate-argument structure by using a word other than a word indicating a type of argument of a predicate in the predicate-argument structure; a combination identification (22) unit that compares the vector generated for each predicate-argument structure for the first text and the vector generated for each predicate-argument structure for the second text, and identifies combinations of the predicate-argument structures of the first text and the predicate-argument structure of the second text based on a result of the comparison; and an entailment determination unit (23) that obtains a feature amount for each of the identified combinations, and determines whether the first text entails the second text based on the obtained feature amounts.

24 Claims, 7 Drawing Sheets

(56) References Cited

OTHER PUBLICATIONS

Andreevskaia, Alina, Zhuoyan Li, and Sabine Bergler. "Can shallow predicate argument structures determine entailment." Proceedings of the Pattern Analysis, Statistical Modelling, and Computational Learning (PASCAL) Challenges Workshop on Recognising Textual Entailment. 2005.*

Matsuyoshi, Suguru, et al. "A database of relations between predicate argument structures for recognizing textual entailment and contradiction." Universal Communication, 2008. ISUC'08. Second International Symposium on. IEEE, 2008.*

Shibata, Tomohide, and Sadao Kurohashi. "Predicate-argument structure based textual entailment recognition system of KYOTO team for the NTCIR9 RITE." Proceedings of the 9th NII Test Collection for Information Retrieval Workshop (NTCIR'11). 2011.*

Asher Stern et al., Rule Chaining and Approximate Match in Textual Inference, National Institute of Standards and Technology, Oct. 27, 2010, 12 pages.

Kotani Michitaka et al., Iikae Hyogen no Jutsugoko Kozo heno Seikika to Text Gani Kankei Ninshiki deno Riyo, Proceedings of The Fifteenth Annual Meeting of The Association for Natural Language Processing, Mar. 2, 2009, pp. 260-263.

Shuya Abe et al., Event Relation Acwuísition with Syntactic Patterns and Shared Arguments, Graduate School of Information Science, Nara Institute of Science and Technology, vol. 17, No. 1, Jan. 2010, pp. 121-139.

Tomohide Shibata et al., Acquiring Strongly-related Events Using Predicate-argument co-occurring Statistics and Caseframe, IPSJ SIG Technical Report, vol. 2011-NL-203, No. 2011, pp. 1-8.

* cited by examiner

T1: Mr. B was approved as the president of Company A (Tokyo) by the general meeting of shareholders.

approve (subject: general meeting of shareholders, object: Mr. B, goal: the president of Company A (Tokyo))

T2: Mr. B who lives Tokyo was inaugurated as the president of Company A.

be inaugurated (subject: Mr. B, goal: the president of Company A)

live (subject: Mr. B, place: Tokyo)

H: Mr. B became the president of Company A located in Tokyo.

become (subject: Mr. B, goal: the president of Company A located in Tokyo)

be located (subject: Company A, place: Tokyo)

FIG. 4

T1: approve (subject: general meeting of shareholders, object: Mr. B, goal: the president of Company A (Tokyo))

(approve, stockholder, general meeting, Mr. B, Company A, Tokyo, president)

T2: be inaugurated (subject: Mr. B, goal: the president of Company A)
live (subject: Mr. B, place: Tokyo)

(be inaugurated, Mr. B, Company A, president)
(live, Mr. B, Tokyo)

H: become (subject: Mr. B, goal: the president of Company A located in Tokyo)
be located (subject: Company A, place: Tokyo)

(become, Mr. B, Tokyo, Company A, president)
(be located, Company A, Tokyo)

FIG. 5

T1: approve (subject: general meeting of shareholders, object: Mr. B, goal: the president of Company A (Tokyo))

⇩

(approve, stockholder, general meeting, Mr. B, Company A, Tokyo, president)

(be located, Company A, Tokyo)   (become, Mr. B, Tokyo, Company A, be located President)

⇧   ⇧

H: be located (subject: Company A, place: Tokyo)   become (subject: Mr. B, goal: the president of Company A located in Tokyo)

T2: live (subject: Mr. B, place: Tokyo)   be inaugurated (subject: Mr. B, goal: the president of Company A)

⇩   ⇩

(live, Mr. B, Tokyo)   (be inaugurated, Mr. B, Company A, president)

(be located, Company A, Tokyo)   (become, Mr. B, Tokyo, Company A, be located, president)

⇧   ⇧

H: be located (subject: Company A, place: Tokyo)   become (subject: Mr. B, goal: the president of Company A located in Tokyo)

FIG. 6

T1: approve (subject: general meeting of shareholders, object: Mr. B, goal: the president of Company A (Tokyo))

coverage =0.66          coverage =0.66

H:    be located (subject: Company A, place: Tokyo)      become (subject: Mr. B, goal: the president of Company A located in Tokyo)

entailment score=(0.66+0.66)/2=0.66    $\geq 0.50$ → entailing

T2: live (subject: Mr. B, place: Tokyo)      be inaugurated (subject: Mr. B, goal: the president of Company A)

coverage =0.33          coverage =0.5

H:    be located (subject: Company A, place: Tokyo)      become (subject: Mr. B, goal: the president of Company A located in Tokyo)

entailment score=(0.33+0.5)/2=0.415    $\leq 0.50$ → not entailing

FIG. 7

TEXTUAL ENTAILMENT RECOGNITION APPARATUS, TEXTUAL ENTAILMENT RECOGNITION METHOD, AND COMPUTER-READABLE RECORDING MEDIUM

This application is the National Phase of PCT/JP2012/075765 filed Oct. 4, 2012, which claims priority to Japanese Application No. 2011-230773, Oct. 20, 2011, the disclosures of which are hereby incorporated by reference in their entirety.

TECHNICAL FIELD

The present invention relates to a textual entailment recognition apparatus and a textual entailment recognition method for determining whether a specific text entails another text, and a computer-readable recording medium having recorded thereon a program for implementing the aforementioned apparatus and method.

BACKGROUND ART

In recent years, attention has been placed on textual entailment recognition in order to achieve sophistication of the large number of applications for handling natural languages, such as retrieval of natural sentences having meaning. The textual entailment recognition refers to a task of determining, when a text T and a text H are given, whether "the text H can be inferred from the text T".

For example, when "text T: Company N has profits of ¥50 billion" and "text H: Company N is in the black" are given, the text H can be inferred from the text T and it is determined that the text T entails the text H. The reason is that "profits of ¥50 billion" is considered to be sufficient to mean "in the black".

For example, Non-Patent Document 1 discloses an example of a conventional textual entailment recognition system. The textual entailment recognition system disclosed in Non-Patent Document 1 first parses each of the text T and the text H, and creates, for each of the texts, a tree structure in which a verb is a root (top node) and words included in an argument (subject, object, etc.) of the verb are child nodes or grandchild nodes.

Next, the entailment determination system disclosed in Non-Patent Document 1 carries out word replacement and syntactic paraphrasing on the text T, and tries to create, in a subtree of the text T, a tree structure that matches the tree structure of the text H. Then, the entailment determination system determines that the text T entails the text H if the aforementioned tree structure can be created in the subtree of the text T.

Further, with the entailment determination system disclosed in Non-Patent Document 1, it is also possible to perform approximate matching determination when the matching determination is performed on the tree structure, in addition to matching determination as to whether there is a perfect match. Specifically, after creating the above-described tree structure, the entailment determination system creates data called a VAS (Verb-Argument Structure) from the created tree structure.

VAS is a kind of so-called predicate-argument structure, and is composed of a verb serving as a root of a tree structure and a word set separately created for each argument type. For example, in Non-Patent Document 1, the VAS "<kill, (object: Casey, Sheehan), (other: Iraq)>" is generated from the sentence "Casey Sheehan was killed in Iraq". Non-Patent Document 1 also discloses a method for creating a word set from the entirety of child nodes and grandchild nodes if the root is the verb "be", without differentiating between the argument types.

Then, the entailment determination system disclosed in Non-Patent Document 1 determines the percentage of word coverage between the word sets of the same argument for two VASs that were created from the text T and the text H. Subsequently, the entailment determination system determines that the argument contents of the two VASs match if the aforementioned percentage of word coverage is greater than or equal to a predetermined coverage, and furthermore determines that the original tree structures of the two VASs also match if the degree of matching arguments is greater than or equal to a fixed rate. Thus, in the case of generating VASs, not only perfect matching but also approximate matching between the character strings of the arguments of verbs can also be determined.

CITATION LIST

Non-Patent Document

Non-Patent Document 1: Asher Stern et al., "Rule Chaining and Approximate Match in textual inference", Text Analysis Conference 2010, (Online Proceedings), http://www.nist.gov/tac/publications/2010/participant.papers/BIU.proceedings.pdf

DISCLOSURE OF THE INVENTION

Problem to be Solved by the Invention

As described above, the above entailment determination system disclosed in Non-Patent Document 1 can determine whether one of two natural sentences of interest entails the other, and therefore conceivably allows for retrieval of natural sentences, for example.

However, the entailment determination system disclosed in Non-Patent Document 1 has a problem in that entailment determination cannot be performed if the argument structures of the predicates are different. The reason for this is that this entailment determination system tries to perform collation between the texts assuming that the argument structures of the predicates are the same.

For example, assume that "text T: Company A withdrew from the personal computer business" and "text H: Personal computers from Company A will disappear" exist. The above-described entailment determination system disclosed in Non-Patent Document 1 extracts, as VASs, "withdraw (subject: Company A, object: personal computer, business)" from the text T and "disappear (subject: Company A, from, personal computers)" from the text H.

In the case where such VASs are extracted, "withdraw" and "disappear" are different verbs. Consequently, in the above-described entailment determination system disclosed in Non-Patent Document 1, the text T is not determined to entail the text H, even though it does.

Furthermore, in the entailment determination system, even if all verbs are viewed as being equal in the aforementioned case, the subject of "disappear" is different from the subject and object of "withdraw", and therefore, the text T is not determined to entail the text H in this case as well.

Object of the Invention

An example of the object of the present invention is to solve the above-mentioned problems and to provide a textual entailment recognition apparatus, a textual entailment recognition method, and a computer-readable recording medium that can allow for entailment determination of a plurality of texts that are to undergo determination, even if the argument structures of the predicates are different.

Means for Solving the Problem

According to an aspect of the present invention for achieving the foregoing object, there is provided an entailment determination apparatus for determining whether a first text entails a second text, including:

a vector generation unit that acquires a predicate-argument structure of each of the first text and the second text, and generates, for each of the first text and the second text, a vector for each predicate-argument structure by using a word other than a word indicating a type of argument of a predicate in the predicate-argument structure;

a combination identification unit that compares the vector generated for each predicate-argument structure for the first text and the vector generated for each predicate-argument structure for the second text, and identifies combinations of the predicate-argument structures of the first text and the predicate-argument structure of the second text based on a result of the comparison; and an entailment determination unit that obtains a feature amount for each of the identified combinations, and determines whether the first text entails the second text based on the obtained feature amounts.

Also, according to an aspect of the present invention for achieving the foregoing object, there is provided an entailment determination method for determining whether a first text entails a second text, including the steps of (a) acquiring a predicate-argument structure of each of the first text and the second text, and generating, for each of the first text and the second text, a vector for each predicate-argument structure by using a word other than a word indicating the type of argument of a predicate in the predicate-argument structure;

(b) comparing the vector generated for each predicate-argument structure for the first text and the vector generated for each predicate-argument structure for the second text, and identifying combinations of the predicate-argument structures of the first text and the predicate-argument structure of the second text based on a result of the comparison; and (c) obtaining a feature amount for each of the identified combinations, and determining whether the first text entails the second text based on the obtained feature amounts.

Furthermore, according to an aspect of the present invention for achieving the foregoing object, there is provided a computer-readable recording medium having recorded thereon a program for determining whether a first text entails a second text by a computer, the program including an instruction for causing the computer to execute the steps of:

(a) acquiring a predicate-argument structure of each of the first text and the second text, and generating, for each of the first text and the second text, a vector for each predicate-argument structure by using a word other than a word indicating the type of argument of a predicate in the predicate-argument structure;

(b) comparing the vector generated for each predicate-argument structure for the first text and the vector generated for each predicate-argument structure for the second text, and identifying combinations of the predicate-argument structures of the first text and the predicate-argument structure of the second text based on a result of the comparison; and (c) obtaining a feature amount for each of the identified combinations, and determining whether the first text entails the second text based on the obtained feature amounts.

Effects of the Invention

As described above, according to the present invention, it is possible to allow for entailment determination of a plurality of texts that are to undergo determination, even if the argument structures of the predicates are different.

DESCRIPTION OF EMBODIMENT

Embodiment

Hereinafter, an entailment determination apparatus, an entailment determination method, and a program according to an embodiment of the present invention will be described with reference to FIGS. 1 to 7.

Configuration of Apparatus

Figure 1:
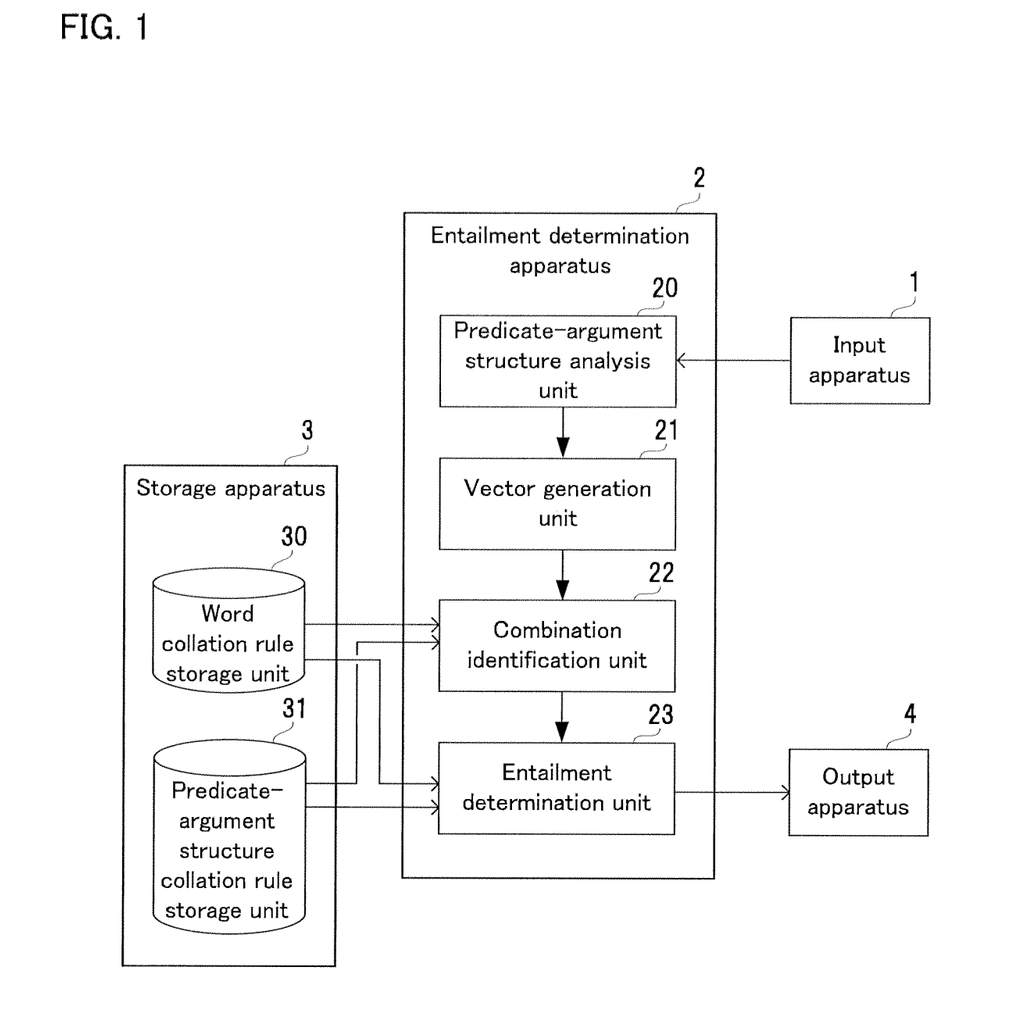
FIG. 1 is a block diagram showing a configuration of an entailment determination apparatus according to an embodiment of the present invention.

First, a configuration of an entailment determination apparatus according to an embodiment of the present invention will be described with reference to FIG. 1. FIG. 1 is a block diagram showing a configuration of an entailment determination apparatus according to an embodiment of the present invention.

The entailment determination apparatus 2 shown in FIG. 1 according to the present embodiment is an apparatus for determining whether a first text entails a second text. As shown in FIG. 1, the entailment determination apparatus 2 includes a vector generation unit 21, a combination identification unit 22, and an entailment determination unit 23.

Of these, the vector generation unit 21 first acquires the respective predicate-argument structures of the first text and the second text. Then, the vector generation unit 21 generates, for each of the first text and the second text, a vector for each predicate-argument structure, by using words other than a word indicating the type of argument of a predicate in the predicate-argument structure.

The combination identification unit 22 compares the vector generated for each predicate-argument structure for the first text with the vector generated for each predicate-argument structure for the second text, and identifies combinations of the predicate-argument structures of the first text and the predicate-argument structures of the second text based on a result of the comparison.

The entailment determination unit 23 calculates a feature amount for each of the identified combinations, and determines whether the first text entails the second text based on the calculated feature amounts.

Thus, with the entailment determination apparatus 2, combinations of predicate-argument structures that are to undergo determination are identified from the result of a comparison of vectors that disregards argument structures, and entailment between the texts is determined based on the identified combinations. Accordingly, with the entailment determination apparatus 2, it is possible to early out entailment, determination for a plurality of texts that are to undergo determination, even if the argument structures of the predicates are different.

Next, the configuration of the entailment determination apparatus 2 in the present embodiment will be described in further detail. First, in the present embodiment, the entailment determination apparatus 2 is an apparatus that operates by program control, and is implemented by executing a program described below on a computer.

Further, in the present embodiment, a "predicate-argument structure" includes at least a predicate (verb) included in a text, a word serving as the argument of the predicate, and a word (label) indicating the type of argument (see FIG. 3 described below). Accordingly, in the present embodiment, "word(s) other than a word indicating the type of argument of a predicate in the predicate-argument structure" means the predicate (verb) and the word serving as the argument.

As shown in FIG. 1, in the present embodiment, an input apparatus 1, a storage apparatus 3 that stores various data used in the entailment determination apparatus 2, and an output apparatus 4 for outputting results are connected to the entailment determination apparatus 2. The entailment determination apparatus 2 constructs an entailment determination system, together with the input apparatus 1, the storage apparatus 3, and the output apparatus 4.

The input apparatus 1 inputs two texts, namely, a first text and a second text, that are to undergo entailment determination performed by the entailment determination apparatus 2, into the entailment determination apparatus 2. Note that in the following description, the first text may be referred to as "text T" or simply as "T", and the second text may be referred to as "text H" or simply as "H".

In the present embodiment, the text T and the text H that are to undergo entailment determination may be texts of arbitrary units that are defined by a given method. Examples of the text T and the text H that are to undergo entailment determination include some or all of a text constituting a text file, a text created by linking character strings included in an arbitrary subtree obtained through parsing, and a text created by linking character strings in a predicate-argument structure.

The output apparatus 4 outputs a result of entailment determination performed by the entailment determination apparatus 2 for the text T and the text H input from the input apparatus 1. Specific examples of the output apparatus 4 include a display apparatus and a printer.

The storage apparatus 3 includes a word collation rule storage unit 30 and a predicate-argument structure collation rule storage unit 31. In the present embodiment, the entailment determination apparatus 2 can use information stored in the storage apparatus 3, and therefore can achieve an improvement in entailment determination accuracy as compared to the case where the storage apparatus 3 is not connected thereto.

The word collation rule storage unit 30 stores an entailment rule (word collation rule) that can be established between words, such as synonyms, hyponyms, meronyms, and derivations. Examples of the word collation rule include "Nippon Electric Company, Limited→NEC", "run→move", "Tokyo→Japan", and "manufacturer→manufacture".

The predicate-argument structure collation rule storage unit 31 stores an argument relation (predicate-argument structure collation rule) between the predicate-argument structures that are to be collated during entailment determination. Examples of the predicate-argument structure collation rule include "withdraw (subject. X, object: Y)→disappear (subject: Y of X)", and "kill (object: X)→die (subject: X)".

In the present embodiment, the entailment determination apparatus 2 includes a predicate-argument structure analysis unit 20, in addition to the vector generation unit 21, the combination identification unit 22, and the entailment determination unit 23 described above. The predicate-argument structure analysis unit 20 parses the texts input by the input apparatus 1, and extracts a predicate-argument structure from each of the texts based on a result of the parsing. Further, the predicate-argument structure analysis unit 20 outputs the extracted predicate-argument structures to the vector generation unit 21.

In the present embodiment, as described above, the vector generation unit 21 extracts words other than a word indicating the type of argument of a predicate in the predicate-argument structure, i.e., a predicate, a word serving as an argument of the predicate, and uses these words to generate vectors. Also, the vector generation unit 21 generates a vector for each predicate-argument structure of each text, i.e., for each of the predicate-argument structures in the case where each text includes a plurality of predicate-argument structures. The vector generation unit 21 outputs the generated vectors to the combination identification unit 22.

In the present embodiment, the combination identification unit 22 can read a collation rule from each of the word collation rule storage unit 30 and the predicate-argument structure collation rule storage unit 31, and identify a combination by referring to the collation rules. Furthermore, the combination identification unit 22 outputs the identified combination to the entailment determination unit 23.

Also, in the present embodiment, the combination identification unit 22 calculates a similarity between the vector generated for each predicate-argument structure for the text T and the vector generated for each predicate-argument structure for the text H. Then, the combination identification unit 22 identifies combinations of the predicate-argument structures of the text T and the predicate-argument structure of the text H based on the calculated similarities.

Specifically, assume, for example, that the text T includes only a single predicate-argument structure. In this case, the combination identification unit 22 identifies, for each predicate-argument structure of the text H, a combination of the predicate-argument structure and the single predicate-argument structure of the text T. In other words, in this case, the number of combinations corresponding to the number of the predicate-argument structures of the text H is identified.

On the other hand, assume that the text T includes a plurality of predicate-argument structures. In this case, the combination identification unit 22 calculates a similarity for all possible pairs of the vectors generated from the predicate-argument structures of the text H and the vectors generated from the predicate-argument structures of the text T. Then, the combination identification unit 22 specifies any pairs having a similarity greater than or equal to a threshold value or the pair having the highest similarity and identifies the two predicate-argument structures from which the specified pair is created.

In the present embodiment, the entailment determination unit 23 calculates a feature amount based on words other than a word indicating the type of argument of a predicate in the predicate-argument structure (a predicate and the word serving as its argument). Examples of the feature amount include the degree of word coverage and the degree of word matching for only words serving as arguments between the predicate-argument structure of the text T and the predicate-argument structure of the text H.

For example, the entailment determination unit 23 can set a threshold value for the feature amount, and determine that the text T entails the text H if the feature amount is greater than or equal to the set threshold value. Furthermore, in the present embodiment, the entailment determination unit 23 can also perform the determination using the structural feature of the predicate-argument structure, in addition to the feature amount.

Thereafter, the entailment determination unit 23 outputs the result of the entailment determination to the output apparatus 4. Note that in the present embodiment, there is no particular limitation with respect to the determination criteria used in the entailment determination, and any determination criteria that have been conventionally used for entailment determination can be used.

Operation of Apparatus

Figure 2:
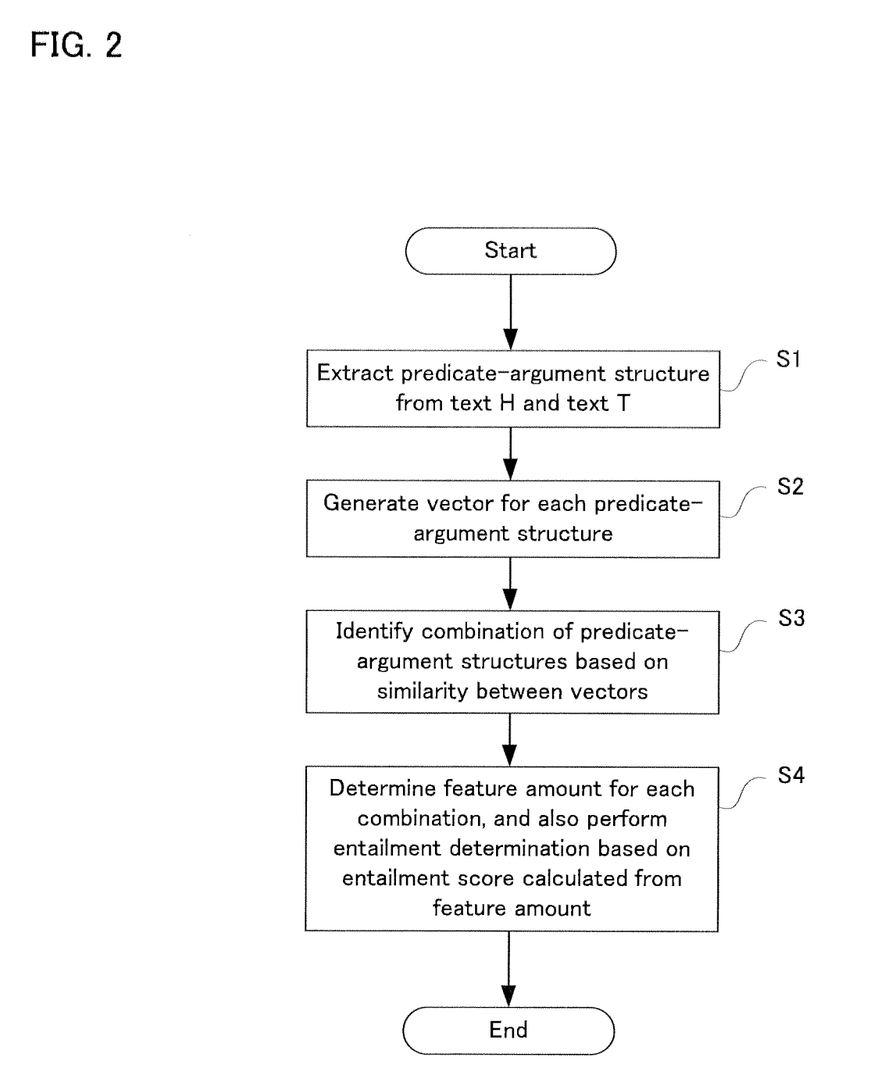
FIG. 2 is a flowchart illustrating an operation of an entailment determination apparatus according to an embodiment of the present invention.

Next, an operation of the entailment determination apparatus 2 according to an embodiment of the present invention will be described with reference to FIG. 2. FIG. 2 is a flowchart illustrating an operation of an entailment determination apparatus according to the embodiment of the present invention. In the following description, reference is made to FIG. 1 where necessary. Also, in the present embodiment, an entailment determination method is performed by operating the entailment determination apparatus 2. Therefore, the following description of the operation of the entailment determination apparatus 2 substitutes for a description of the entailment determination method in the present embodiment.

Processing for Extracting Predicate-Argument Structure

First, as shown in FIG. 2, the predicate-argument structure analysis unit 20 receives inputs of the text T and the text H from the input apparatus 1, and extracts predicate-argument structures from the text T and text H received as inputs (step S1).

Here, a specific example of the predicate-argument structures will be described with reference to FIG. 3. FIG. 3 is a diagram showing an example of predicate-argument structures extracted from texts. In the example shown in FIG. 3, the text T and the text H are illustrated, and the text T is composed of two texts, namely, a text T1 and a text T2. Upon input of the texts T1 and T2 and the text H shown in FIG. 3, the entailment determination apparatus 2 determines whether the text T1 entails the text H, and whether the text T2 entails the text H.

Figure 3:
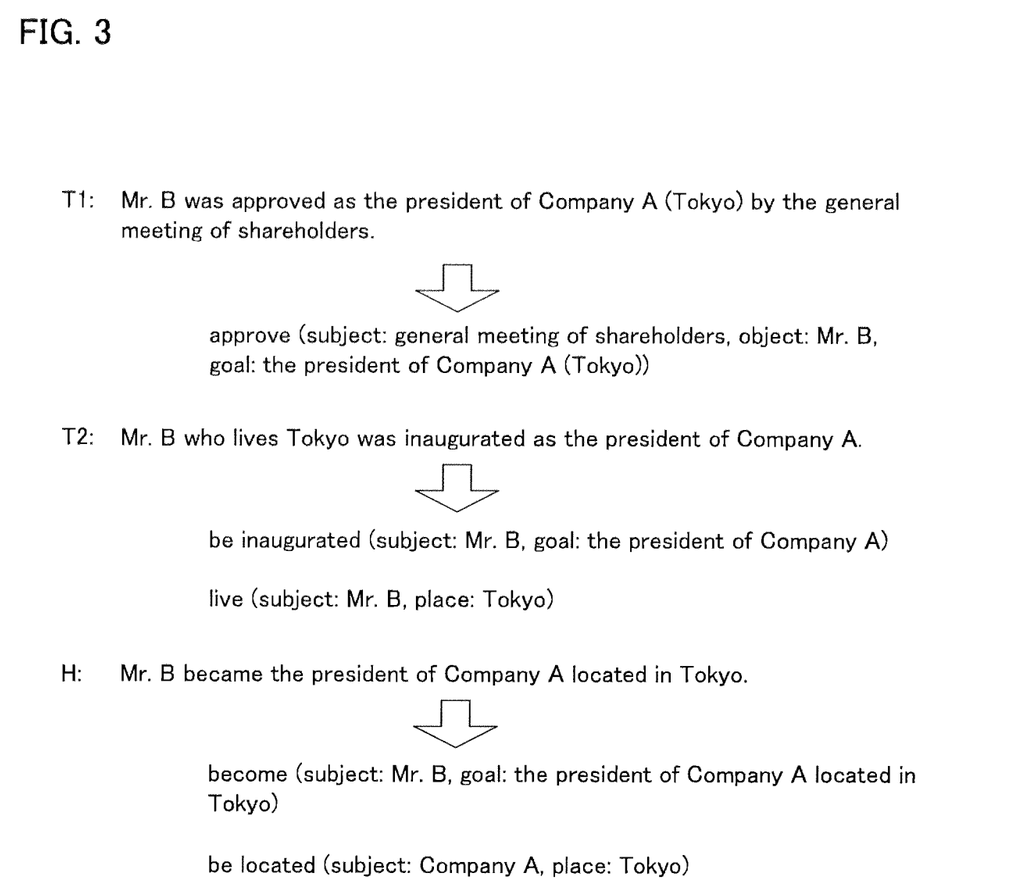
FIG. 3 is a diagram showing an example of predicate-argument structures extracted from texts.

Also, in the example of FIG. 3, the predicate-argument structure analysis unit 20 extracts, as a predicate-argument structure, "approve (subject: general meeting of shareholders, object: Mr. B, goal: the president of Company A (Tokyo)" from the text "T1: Mr. B was approved as the president of Company A (Tokyo) by the general meeting of shareholders", since the predicate is "approve".

Furthermore, the predicate-argument structure analysis unit 20 extracts, as predicate-argument structures, "be inaugurated (subject: Mr. B, goal: the president of Company A)" and "live (subject: Mr. B, place: Tokyo)" from the text "T2: Mr. B who lives Tokyo was inaugurated as the president of Company A" since the predicates are "be inaugurated" and "live".

Also, the predicate-argument structure analysis unit 20 extracts, as predicate-argument structures, "become (subject: Mr. B, goal: the president of Company A located in Tokyo)" and "be located (subject: Company A, place: Tokyo)" from the text "H: Mr. B became the president of Company A located in Tokyo", since the predicates are "become" and "be located".

Note that in the example shown in FIG. 3, a correct answer is given when it is determined that T1 entails H, but T2 does not entail H. This is because the information "Company A is located in Tokyo" cannot be read from T2.

Processing for Generating Predicate-Argument Structure Vector

Next, the vector generation unit 21 acquires the predicate-argument structure of each of the texts extracted in step S1, and, for each of the texts, creates a vector (hereinafter, referred to as a "predicate-argument structure vector"), for each predicate-argument structure, whose components are a predicate and a word serving as an argument of the predicate in the predicate-argument structure (step S2).

Figure 4:
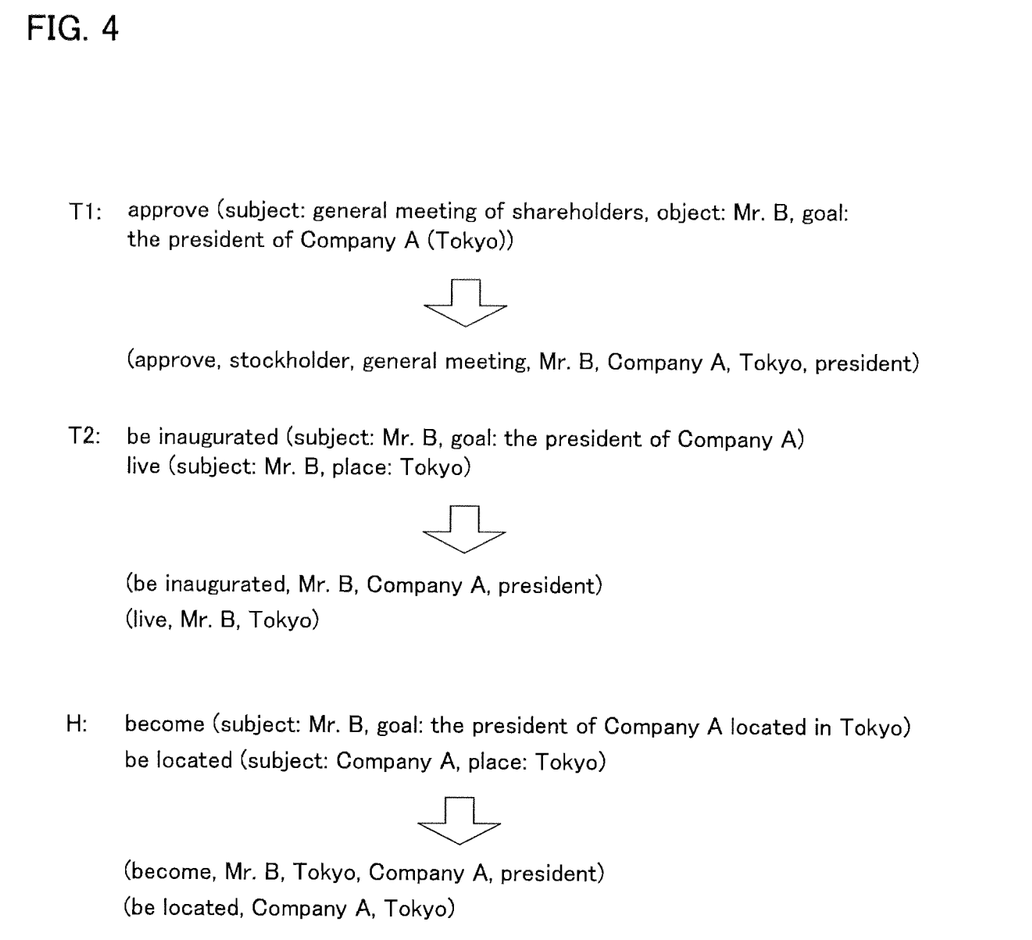
FIG. 4 is a diagram showing vectors generated from the predicate-argument structures shown in FIG. 3.

FIG. 4 shows vectors generated from the predicate-argument structures shown in FIG. 3. As shown in FIG. 4, the vector generation unit 21 uses only content words such as a predicate and a word serving as an argument of the predicate to generate a predicate-argument structure vector. In the present embodiment, it is sufficient that a predicate-argument structure vector includes, as its components, a word other than a word indicating the type of argument of the predicate in a predicate-argument structure.

Specifically, as shown in FIG. 4, the vector generation unit 21 generates, (approve, stockholder, general meeting, Mr. B, Company A, Tokyo, president) as a predicate-argument structure vector, from the predicate-argument structure "approve (subject: general meeting of shareholders, object: Mr. B, goal: the president of Company A (Tokyo))", which was extracted from T1.

Also, the vector generation unit 21 generates (be inaugurated, Mr. B, Company A, president) and (live, Mr. B, Tokyo) from "be inaugurated (subject: Mr. B, goal: the president of Company A)" and "live (subject: Mr. B, place: Tokyo)", which were extracted from T2.

Furthermore, the vector generation unit 21 generates (become, Mr. B, Tokyo, Company A, president) and (be located, Company A, Tokyo) from "become (subject: Mr. B, goal: the president of Company A located in Tokyo)" and "be located (subject: Company A, place: Tokyo)", which were extracted from H.

In the present embodiment, the vector generation unit 21 can also add, for example, any information that can be acquired from an argument structure (hereinafter, referred to as "structural information"), such as "predicate_type of argument_word", to the predicate-argument structure vector. In this case, the vector generation unit 21 can generate, for example, a vector such as (approve, stockholder, general meeting, Mr. B, Company A, Tokyo, president, predicate: approve, approve_subject_stockholder, approve_subject_ general meeting, approve_object_Mr. B, . . . ).

Processing for Identifying Combination of Predicate-Argument Structures

Next, the combination identification unit 22 calculates a similarity of the vector obtained from each of the predicate-argument structures of the text T1 and the text T2 with respect to each of the vectors obtained from the predicate-argument structure of the text H, and identifies combinations of the predicate-argument structures based on the similarities (step S3). For example, the combination identification unit 22 specifies a pair of vectors having a similarity greater than or equal to the threshold value, or the pair of vectors having the highest similarity, and identifies the two predicate-argument structures from which the specified pair is created.

To calculate a similarity, two predicate-argument structure vectors that are to be calculated are converted into a vector whose number of dimensions takes a value obtained by subtracting the number of common character strings from a total value of the number of character strings of both vectors. At this time, a component in which a character string exists is set as "1" and a component in which a character string does not exist set as "0".

For instance, an example will be given for (live, Mr. B, Tokyo) of the text T2 and (became, Mr. B, Tokyo, Company A, be located, president) of the text H. In this case, the number of dimensions is 7 (=3+6−2). Further, the former is converted into (1, 1, 1, 0, 0, 0, 0), and the latter is converted into (0, 1, 1, 1, 1, 1, 1). Also, a weight value estimated in a certain manner may be added to the components of each of the converted vectors.

Figure 5:
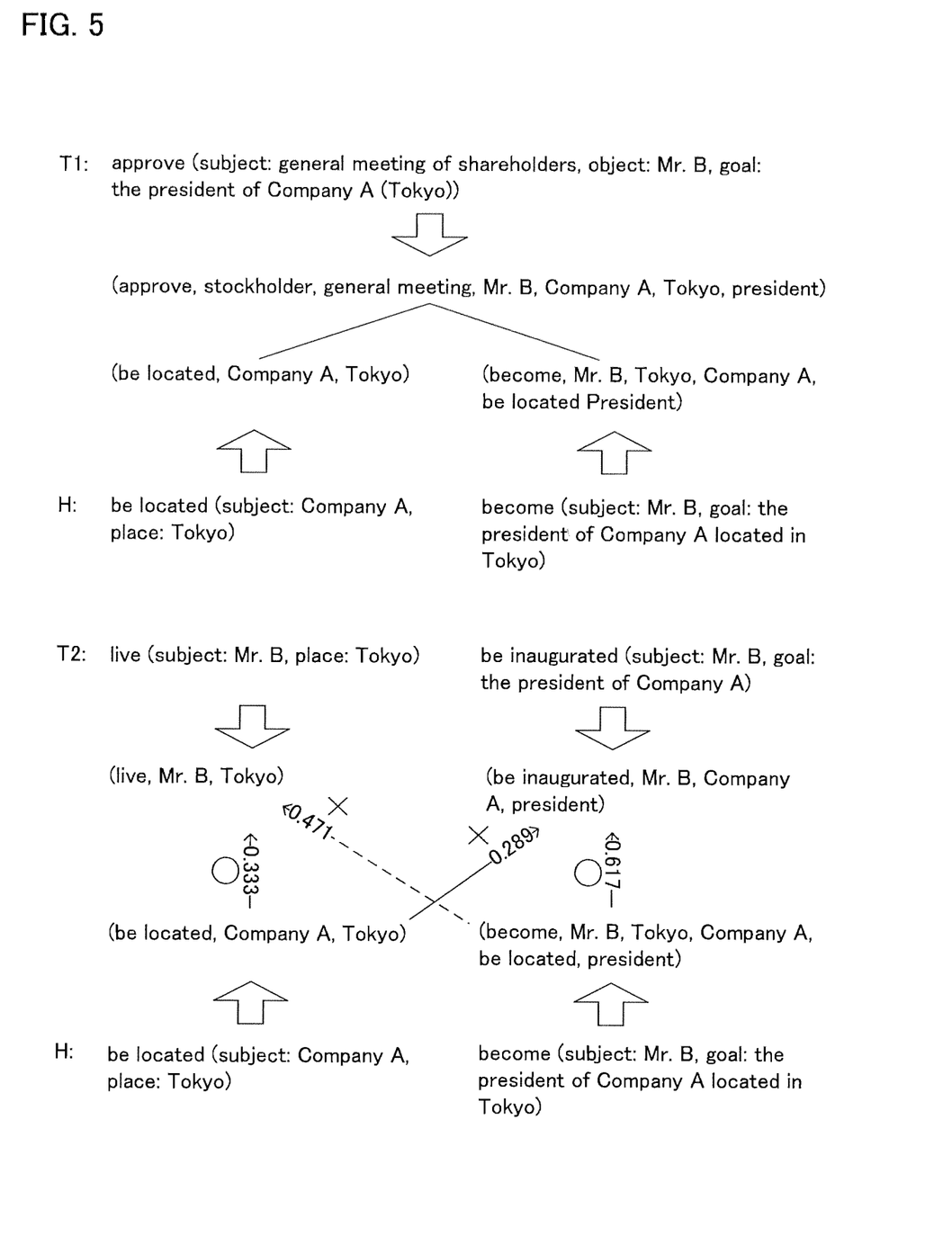
FIG. 5 is a diagram illustrating an example of combination identification processing executed in the present embodiment.

Here, a specific example of the processing of step S3 will be described with reference to FIG. 5. FIG. 5 is a diagram illustrating an example of combination identification processing executed in the present embodiment. In the example in FIG. 5, the threshold value of similarity is set to 0.5, and a cosine similarity sim is calculated using Expression 1 below. In Expression 1 below, x and y represent two converted vectors that are to be calculated. Furthermore, in Expression 1 below, (x·y) represents the inner product of a vector x and a vector y, |x| represents the length of the vector x, and |y| represents the length of the vector y.

$$\text{sim} = (x \cdot y)/(|x||y|) \quad \text{Expression 1}$$

As shown in FIG. 5, first, assume that T1 and H are to undergo entailment determination. Since T1 includes only one predicate-argument structure, a combination of the predicate-argument structure of T1 and "be located (subject: Company A, place: Tokyo)" of H, and a combination of the same predicate-argument structure of T1 and "become (subject: Mr. B, goal: the president of Company A located in Tokyo)" of H are automatically identified.

On the other hand, assuming that T2 and H are to undergo entailment determination, a similarity is calculated for all possible vector pairs. From Expression 1 above, the similarity between the predicate-argument structure vectors "be located (subject: Company A, place: Tokyo)" of H and "live (subject: Mr. B, place: Tokyo)" of T2 is calculated to be 0.333. Also, the similarity between the predicate-argument structure vectors "be located (subject: Company A, place: Tokyo)" of H and "be inaugurated (subject: Mr. B, goal: the president of Company A)" of T2 is calculated to be 0.289.

Although both similarities do not exceed the threshold value in this case, "live (subject: Mr. B, place: Tokyo)", which has the maximum similarity, is identified as the predicate-argument structure that is to undergo determination for "be located (subject: Company A, place: Tokyo)" of H.

Likewise, for "become (subject: Mr. B, goal: the president of Company A located in Tokyo)" of H, the similarity of the predicate-argument structure vector with respect to "be inaugurated (subject: Mr. B, goal: the president of Company A)" of T2 is calculated to be 0.617, and the similarity of predicate-argument structure vector with respect to "live (subject: Mt B, place: Tokyo)" is calculated to be 0.471. In this case, the latter similarity falls below the threshold value, and therefore only "be inaugurated (subject: Mr. B, goal: the president of Company A)" having the maximum similarity is identified as the predicate-argument structure that is to undergo determination.

Also, in the present embodiment, the combination identification unit 22 can refer to the word collation rule stored in the word collation rule storage unit 30, and calculate the similarity while regarding the two words defined in the word collation rule as matching.

For example, in the case where a verb and a noun having a derivation relation are predetermined in the word collation rule, the combination identification unit 22 can calculate the similarity while regarding the verb and the noun as matching words. As a result, it is possible to more appropriately identify a predicate-argument structure that is to undergo determination, without being limited to the predicate-argument structures.

Furthermore, in the present embodiment, if the structural information described in the description of step S2 is added to the predicate-argument structure vector, the combination identification unit 22 refers to the predicate-argument structure collation rule stored in the predicate-argument structure collation rule storage unit 31. Then, in this case, the combination identification unit 22 calculates the similarity while regarding the respective arguments of the two predicate-argument structures defined in the predicate-argument structure collation rule as matching words. Alternatively, in this case, the combination identification unit 22 can refer to the word collation rule when determining the matching between the arguments.

In step S3, the combination identification unit 22 can execute normalization processing in accordance with the amount of information included in each of the argument structure vectors during the similarity calculation, in order to identify a predicate-argument structure that does not include redundant information. Examples of the amount of the information included in the predicate-argument structure vector include the number of non-0 (zero) components of the vectors and the weight of the components. Furthermore, examples of the similarities calculated after execution of normalization processing include a cosine similarity and a jaccard coefficient.

For example, a consideration will be given to the predicate-argument structure "announce (subject: president, purpose: that Mr. B becomes the chairman)". In this case, the predicate-argument structure "become (subject: Mr. B, goal: chairman)" is inherent in the "purpose" of the predicate-argument structure. Therefore, when attempting to identify the predicate-argument structure that is to undergo determination for the predicate-argument structure "become (subject: Mr. B, goal: president)" using the number of common words as the similarity the similarity with the former predicate-argument structure is three words, and the similarity with the latter predicate-argument structure that is inherent in the former is two words. As a result, if the number of common words is used as the similarity the former tends to be selected as the predicate-argument structure that is to undergo determination.

However, since the former predicate-argument structure includes the word "president" even though it does not mean that Mr. B is the president, there is the possibility that, depending on the determination criteria of the entailment determination unit 23 described below, the erroneous entailment determination that "become (subject: Mr. B, goal: president)" entails the former predicate-argument structure may result.

Therefore, for example, it is possible to perform normalization by dividing the number of common words of each of the predicate-argument structure vectors by the larger of the respective numbers of words of the two predicate-argument structure vectors. In this case, the similarity of the former predicate-argument structure is 0.6 (=3/5) and the similarity of the latter predicate-argument structure is 0.66 (=2/3), so that the latter tends to be selected as the predicate-argument structure that is to undergo determination.

As such, when the above-described normalization processing is executed during the similarity calculation, the predicate-argument structure that does not include redundant information tends to be selected. Accordingly, the possibility of an erroneous entailment determination can be reduced.

Entailment Determination Processing

Finally, the entailment determination unit 23 obtains the feature amount for each of the combinations of the predicate-argument structures on the H side and the predicate-argument structures on the T side that are to undergo determination, which were identified by the combination identification unit 22 in step S3, and determines whether T entails H based on the feature amounts (step S4). Also, in the present embodiment, the entailment determination unit 23 calculates the entailment score between T and H, for example, based on the obtained feature amounts, and determines that T entails H if the entailment score is greater than or equal to a given value.

Specifically, the entailment determination unit 23 obtains, as the feature amount, the degree of word coverage, or the degree of word matching for only the word serving as the argument between predicate-argument structures, based on words other than a word indicating the type of argument of a predicate in the predicate-argument structure (a predicate and a word serving as the argument of the predicate). Furthermore, as with the combination identification unit 22, the entailment determination unit 23 can use one or both of the word collation rule and the predicate-argument structure collation rule to obtain the feature amount.

Figure 6:
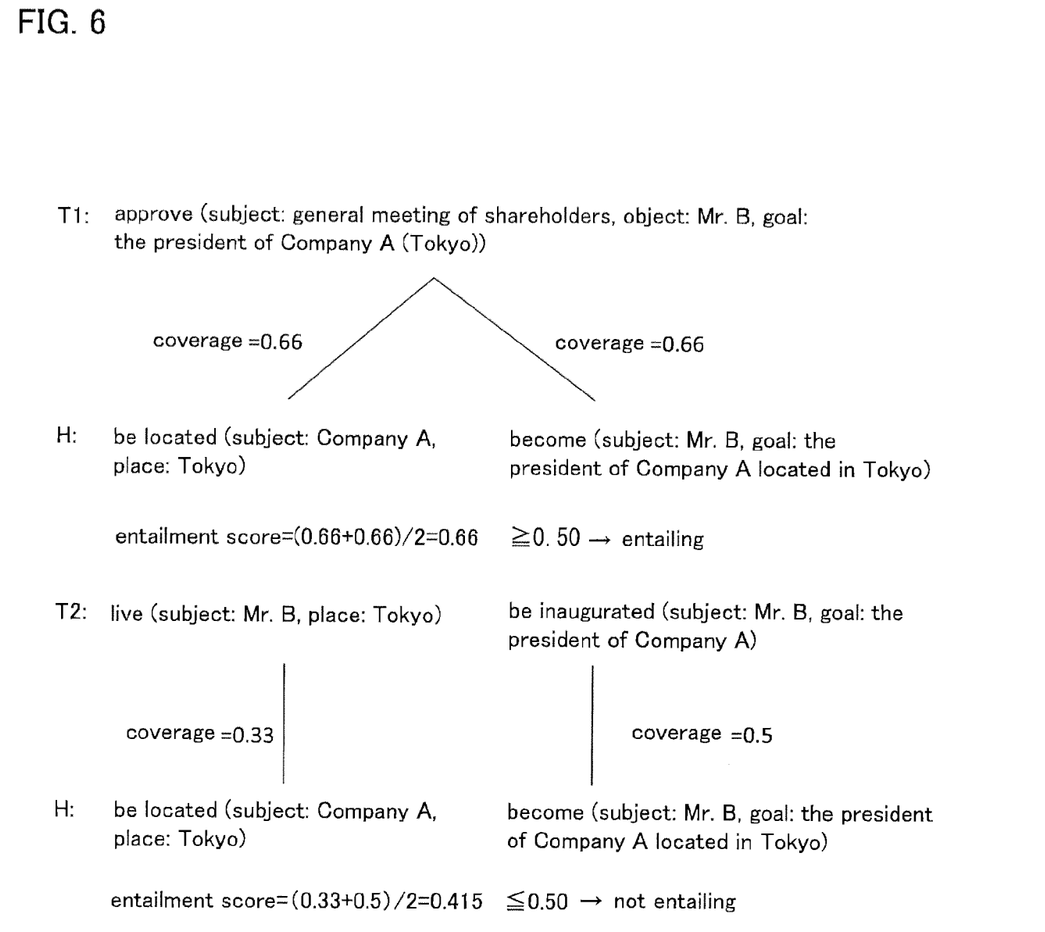
FIG. 6 is a diagram illustrating an example of entailment determination processing executed in the present embodiment.

Here, a specific example of the processing in step S4 will be described with reference to FIG. 6. FIG. 6 is a diagram showing an example of entailment determination processing executed in the present embodiment. In the example in FIG. 6, the degree of word coverage (percentage of coverage) between predicate-argument structures is obtained as the feature amount. Specifically, when "a" represents the number of matching components of the predicate-argument structure vector of H and the predicate-argument structure vector of T1 or T2, and b represents the total number of components of the predicate-argument structure vector of H in the identified combination, the percentage of coverage can be calculated using Expression 2 below.

Percentage of coverage=$a/b$      Expression 2

Furthermore, in the example in FIG. 6, an average value of the feature amounts calculated between T1 or T2 and H is calculated and this average value is used as the entailment score. Then, if the entailment score is greater than or equal to 0.50, it is determined that T1 or T2 entails H.

As shown in FIG. 6, in entailment determination of T1 and H, the percentage of coverage between "be located (subject: Company A, place: Tokyo)" of H and "approve (subject: general meeting of shareholders, object: Mr. B, goal: the president of Company A (Tokyo))" of T1 is 0.66 (=2/3) from Expression 2 above.

The percentage of coverage between "become (subject: Mr. B, goal: the president of Company A located in Tokyo)" of H and "approve (subject: general meeting of shareholders, object: Mr. B, goal: the president of Company A (Tokyo))" of T1 is 0.66 (=4/6) from Expression 2 above.

Therefore, the entailment score between T1 and H is 0.66 (=(0.66+0.66)/2). Consequently, the entailment score is greater than or equal to 0.50, which is the threshold value, and therefore the entailment determination unit 23 determines that "T1 entails H".

On the other hand, in the entailment determination between T2 and H, the percentage of coverage between "be located (subject: Company A, place: Tokyo)" of H and "live (subject: Mr. B, place: Tokyo" of T2 is 0.33=(1/3) from Expression 2 above.

Also, the percentage of coverage between "become (subject: Mr. B, goal: the president of Company A located in Tokyo)" of H and "be inaugurated (subject: Mr. B, goal: the president of Company A)" of T2 is 0.5 (15 (=3/6) from Expression 2 above.

Therefore, the entailment score between T2 and H is 0.415 (=(0.33+0.5)/2). Consequently, the entailment score is smaller than or equal to 0.50, which is the threshold value, the entailment determination unit 23 determines that "T2 does not entail H".

Furthermore, in the present embodiment, the entailment determination unit 23 can add a weight to the feature amount when determining the feature amount, based on data obtained through machine learning. Specifically, in the case where a large number of combinations of two texts that can be determined to be entailing have been learned through machine learning, the entailment determination unit 23 can correct the calculated feature amount based on the learned data. Specific examples of machine learning include a decision tree, a perceptron, and a support vector machine.

In the example in FIG. 6 described above, the entailment determination unit 23 performs entailment determination for each of the combinations using the feature amount determined from a predicate included in the predicate-argument structure and a word serving as an argument, but the present embodiment is not limited to the above example.

In the present embodiment, the entailment determination unit 23 can determine whether T entails H using a structural feature of the predicate-argument structure of each text, in addition to the above-described feature amount. Here, examples of the structural feature include the presence or absence of information added to a predicate-argument structure, such as "negation" and "modality (e.g., inference, possibility)" and the type of argument of the predicate.

Specifically, assuming that "was approved" of T1 were "was not approved", "negation" is added to the predicate-argument structure as information. In this case, assuming that "negation" is not added to the H side, the entailment determination unit 23 can determine that T does not entail H based on the fact that "negation" is added to the T side even if the percentage of coverage is high.

Thus, in the present embodiment, in addition to the feature amount determined from a predicate and a word serving as an argument of the predicate, a structural feature of the predicate-argument structure is used in entailment determination, and therefore it is possible to perform accurate entailment determination even if it is difficult to perform entailment determination using only one of them.

Furthermore, in the case where the structural feature of the predicate-argument structure is used in addition to the feature amount, the entailment determination unit 23 can perform entailment determination with preference to one of the feature amount and the structural feature in accordance with the structural similarity between the predicate-argument structure of T and the predicate-argument structure of H. Here, the "structural similarity" is specified, for example, based on the degree of similarity between predicates, or based on the degree of similarity between the types of arguments included in the predicate-argument structures.

For example, assuming that "be (subject: Mr. A, goal: assembly member for Tokyo)" and "be elected (subject: Mr. A, object: assembly member, place: Tokyo)" are to be compared, in this case, the structural similarity between the two predicate-argument structures is low, and therefore the structural feature of the predicate-argument structure is not effective in entailment determination. Accordingly, the entailment determination unit 23 performs entailment determination with preference to the feature amount.

On the other hand, for example, assuming that "persuade (subject: Mr. A, object: Mr. B)" and "describe (subject: Mr. B, object: Mr. A)" are to be compared, in this case, the structural similarity between the two predicate-argument structures is high, and therefore, the structural feature of the predicate-argument structure is effective in entailment determination. Further, in this example, it is highy likely that it will be determined that T entails H if determination is performed using only the above-described feature amount. However, actually, T does not entail H since none of the structural features such as a combination of the type of argument and a word serving as an argument does not mach. Accordingly in this example, the entailment determination unit 23 performs entailment determination with preference to the structural feature.

Effects of Embodiment

Here, a consideration will be given to a case where entailment determination is performed simply using the percentage of coverage of word sets in the texts as the entailment score. Referring to the example in FIG. 3, T1 and T2 both include four words (Company A, Mr. B, Tokyo, president) of the six content words of H. Accordingly, the percentage of coverage of word sets in these texts with respect to H are both 0.66 (=4/6). This means that it is impossible to differentiate between entailment and non-entailment.

In contrast, in the present embodiment, combinations of the predicate-argument structures that are to undergo determination are identified from the result of a comparison of the vectors that disregards argument structures, and entailment between the texts is determined based on the identified combinations. Therefore, as described in relation to step S6 using FIG. 6, it is determined that T1 entails H, and T2 does not entail H. According to the present embodiment, it is possible to perform entailment determination even if the argument structures of the predicates are different.

Program

The program according to the present embodiment may be any program that causes a computer to execute steps S1 to S4 shown in FIG. 2. The entailment determination apparatus 2 and the entailment determination method according to the present embodiment can be implemented by installing the program in a computer and executing the program. In this case, the CPU (Central Processing Unit) of the computer functions as the predicate-argument structure analysis unit 20, the vector generation unit 21, and the combination identification unit 22, and the entailment determination unit 23 and executes the processing. Further, in the present embodiment, a storage apparatus such as a hard disk provided in the computer may function as the storage apparatus 3.

Figure 7:
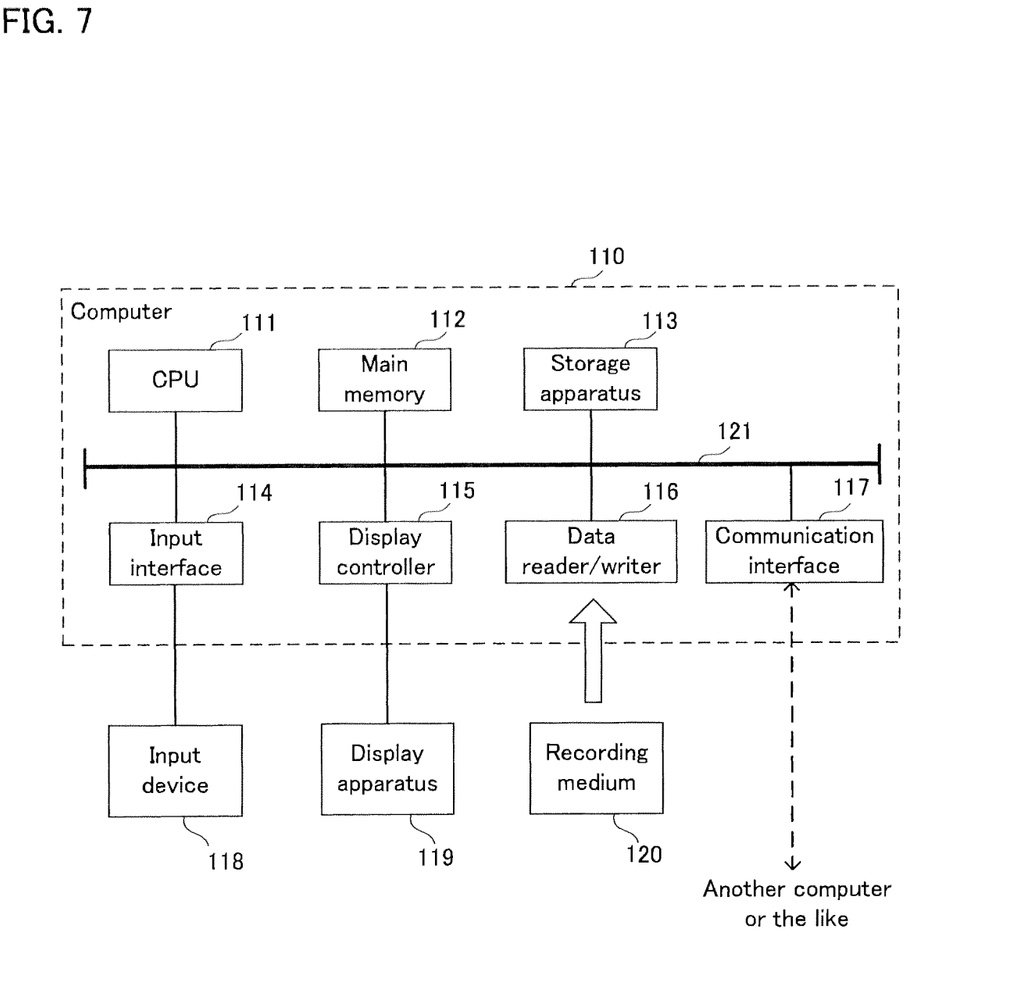
FIG. 7 is a block diagram showing an example of a computer for implementing an entailment determination apparatus according to an embodiment of the present invention.

Here, a description will be given of a computer for implementing the entailment determination apparatus 2 according to the present embodiment by executing a program with reference to FIG. 7. FIG. 7 is a block diagram showing an example of a computer for implementing an entailment determination apparatus according to an embodiment of the present invention.

As shown in FIG. 7, the computer 110 includes a CPU 111, a main memory 112, a storage apparatus 113, an input interface 114, a display controller 115, a data reader/writer 116, and a communication interface 117. These components are connected to one another via a bus 121 so as to be capable of data communication.

The CPU 111 performs various calculations by expanding, in the main memory 112, a program (code) according to the present embodiment that is stored in the storage apparatus 113, and executing the program in a predetermined sequence. The main memory 112 is typically a volatile storage apparatus such as a DRAM (Dynamic Random Access Memory). The program according to the present embodiment is provided in a state in which it is stored in a computer-readable recording medium 120. Note that the program according to the present embodiment may be distributed over the Internet connected via the communication interface 117.

Specific examples of the storage apparatus 113 include a semiconductor memory such as a flash memory, in addition to a hard disk. The input interface 114 mediates the data transmission between the CPU 111 and an input device 118 such as a keyboard and a mouse. The display controller 115 is connected to a display apparatus 119, and controls display on the display apparatus 119. The data reader/writer 116 mediates the data transmission between the CPU 111 and the recording medium 120, reads the program from the recording medium 120, and writes a result of processing performed in the computer 110 into the recording medium 120. The communication interface 117 mediates the data transmission between the CPU 111 and another computer.

Specific examples of the recording medium 120 include general-purpose semiconductor storage devices such as a CF (Compact Flash (registered trademark)) and an SD (Secure Digital), magnetic storage media such as a Flexible Disk, and optical storage media such as a CD-ROM (Compact Disk Read Only Memory).

Although the above-described embodiment can be represented partially or entirely by (Supplementary note 1) to (Supplementary note 24) described below, the present invention is not limited to the following description.

(Supplementary Note 1)

A textual entailment recognition apparatus for determining whether a first text entails a second text, comprising:

a vector generation unit that acquires a predicate-argument structure of each of the first text and the second text, and generates, for each of the first text and the second text, a vector for each predicate-argument structure by using a word other than a word indicating a type of argument of a predicate in the predicate-argument structure;

a combination identification unit that compares the vector generated for each predicate-argument structure for the first text and the vector generated for each predicate-argument structure for the second text, and identifies combinations of the predicate-argument structures of the first text and the predicate-argument structure of the second text based on a result of the comparison; and an entailment determination unit that obtains a feature amount for each of the identified combinations, and determines whether the first text entails the second text based on the obtained feature amounts.

(Supplementary Note 2)

The textual entailment recognition apparatus according to Supplementary note 1, wherein the predicate-argument structure includes a predicate included in the first text or the second text, a word serving as an argument of the predicate, and a word indicating the type of argument, and the vector generation unit uses the predicate and the word serving as the argument of the predicate to generate the vector.

(Supplementary Note 3)

The textual entailment recognition apparatus according to Supplementary note 1 or 2, wherein the combination identification unit calculates a similarity between the vector generated for each predicate-argument structure for the first text and the vector generated for each predicate-argument structure for the second text, and identifies combinations of the predicate-argument structures of the first text and the predicate-argument structure of second text based on the calculated similarities.

(Supplementary Note 4)

The textual entailment recognition apparatus according to Supplementary note 3, wherein the combination identification unit performs normalization processing during calculation of the similarity, in accordance with an amount of information of the vector.

(Supplementary Note 5)

The textual entailment recognition apparatus according to any one of Supplementary notes 1 to 4, wherein the entailment determination unit obtains, for each of the combinations, one of a degree of word coverage and a degree of word matching for only the word serving as the argument between the predicate-argument structure of the first text and the predicate-argument structure of the second text, as the feature amount, based on a word other than a word indicating the type of argument of a predicate in the predicate-argument structure.

(Supplementary Note 6)

The textual entailment recognition apparatus according to Supplementary note 5, wherein the entailment determination unit uses, in addition to the feature amount, a structural feature of the predicate-argument structure to determine whether the first text entails the second text.

(Supplementary Note 7)

The textual entailment recognition apparatus according to Supplementary note 6, wherein the entailment determination unit performs determination with preference to one of the feature amount and the structural feature of the predicate-argument structure, in accordance with a structural similarity between the predicate-argument structure of the first text and the predicate-argument structure of the second text.

(Supplementary Note 8)

The textual entailment recognition apparatus according to any one of Supplementary notes 5 to 7, wherein the entailment determination unit adds a weight to the feature amount based on data obtained through machine learning, when obtaining the feature amount.

(Supplementary Note 9)

A textual entailment recognition method for determining whether a first text entails a second text, comprising the steps of (a) acquiring a predicate-argument structure of each of the first text and the second text, and generating, for each of the first text and the second text, a vector for each predicate-argument structure by using a word other than a word indicating the type of argument of a predicate in the predicate-argument structure;

(b) comparing the vector generated for each predicate-argument structure for the first text and the vector generated for each predicate-argument structure for the second text, and identifying combinations of the predicate-argument structures of the first text and the predicate-argument structure of the second text based on a result of the comparison; and (c) obtaining a feature amount for each of the identified combinations, and determining whether the first text entails the second text based on the obtained feature amounts.

(Supplementary Note 10)

The textual entailment recognition method according to Supplementary note 9, wherein the predicate-argument structure includes a predicate included in the first text or the second text, a word serving as an argument of the predicate, and a word indicating the type of argument, and, in the step (a), the predicate and the word serving as the argument of the predicate are used to generate the vector.

(Supplementary Note 11)

The textual entailment recognition method according to Supplementary note 9 or 10, wherein, in the step (b), a similarity between the vector generated for each predicate-argument structure for the first text and the vector generated for each predicate-argument structure for the second text is calculated, and combinations of the predicate-argument structures of the first text and the predicate-argument structure of second text based on the calculated similarities is identified.

(Supplementary Note 12)

The textual entailment recognition method according to Supplementary note 11, wherein, in the step (b), normalization processing is performed during calculation of the similarity, in accordance with an amount of information of the vector.

(Supplementary Note 13)

The textual entailment recognition method according to any one of Supplementary notes 9 to 12, wherein, in the step (c), for each of the combinations, one of a degree of word coverage and a degree of word matching for only the word serving as the argument between the predicate-argument structure of the first text and the predicate-argument structure of the second text is obtained, as the feature amount, based on a word other than a word indicating the type of argument of a predicate in the predicate-argument structure.

(Supplementary Note 14)

The textual entailment recognition method according to Supplementary note 13, wherein, in the step (c), in addition to the feature amount, a structural feature of the predicate-argument structure is used to determine whether the first text entails the second text.

(Supplementary Note 15)

The textual entailment recognition method according to Supplementary note 14, wherein, in the step (c), determination is performed with preference to one of the feature amount and the structural feature of the predicate-argument structure, in accordance with a structural similarity between the predicate-argument structure of the first text and the predicate-argument structure of the second text.

(Supplementary Note 16)

The textual entailment recognition method according to any one of Supplementary notes 13 to 15, wherein, in the step (c), a weight is added to the feature amount based on data obtained through machine learning, when obtaining the feature amount.

(Supplementary Note 17)

A computer-readable recording medium having recorded thereon a program for determining whether a first text entails a second text by a computer, the program including an instruction for causing the computer to execute the steps of (a) acquiring a predicate-argument structure of each of the first text and the second text, and generating, for each of the first text and the second text, a vector for each predicate-argument structure by using a word other than a word indicating the type of argument of a predicate in the predicate-argument structure;

(b) comparing the vector generated for each predicate-argument structure for the first text and the vector generated for each predicate-argument structure for the second text, and identifying combinations of the predicate-argument structures of the first text and the predicate-argument structure of the second text based on a result of the comparison; and (c) obtaining a feature amount for each of the identified combinations, and determining whether the first text entails the second text based on the obtained feature amounts.

(Supplementary Note 18)

The computer-readable recording medium according to Supplementary note 17, wherein the predicate-argument structure includes a predicate included in the first text or the second text, a word serving as an argument of the predicate, and a word indicating the type of argument, and, in the step (a), the predicate and the word serving as the argument of the predicate are used to generate the vector.

(Supplementary Note 19)

The computer-readable recording medium according to Supplementary note 17 or 18, wherein, in the step (b), a similarity between the vector generated for each predicate-argument structure for the first text and the vector generated for each predicate-argument structure for the second text is calculated, and combinations of the predicate-argument structures of the first text and the predicate-argument structure of second text based on the calculated similarities is identified.

(Supplementary Note 20)

The computer-readable recording medium according to Supplementary note 19, wherein, in the step (b), normalization processing is performed during calculation of the similarity, in accordance with an amount of information of the vector.

(Supplementary Note 21)

The computer-readable recording medium according to any one of Supplementary notes 17 to 20, wherein, in the step (c), for each of the combinations, one of a degree of word coverage and a degree of word matching for only the word serving as the argument between the predicate-argument structure of the first text and the predicate-argument structure of the second text is obtained, as the feature amount, based on a word other than a word indicating the type of argument of a predicate in the predicate-argument structure.

(Supplementary Note 22)

The computer-readable recording medium according to Supplementary note 21, wherein, in the step (c), in addition to the feature amount, a structural feature of the predicate-argument structure is used to determine whether the first text entails the second text.

(Supplementary Note 23)

The computer readable recording medium according to Supplementary note 22, wherein, in the step (c), determination is performed with preference to one of the feature amount and the structural feature of the predicate-argument structure, in accordance with a structural similarity between the predicate-argument structure of the first text and the predicate-argument structure of the second text.

(Supplementary Note 24)

The computer-readable recording medium according to any one of Supplementary notes 21 to 23, wherein, in the step (c), a weight is added to the feature amount based on data obtained through machine learning, when obtaining the feature amount.

Although the present invention has been described above with reference to embodiments, the invention is not limited to the above-described embodiments. Various modifications that can be understood by a person skilled in the art may be made to the configuration and the details of the present invention within the scope of the invention.

Industrial Applicability

As described above, according to the present invention, it is possible to implement entailment determination of a plurality of texts that are to undergo determination, even if the argument structures of the predicates are different. Accordingly, the present invention is useful in applications such as semantic retrieval of natural sentences in information retrieval systems. The present invention is also useful in applications such as opinion clustering in text mining.

DESCRIPTIONS OF REFERENCE NUMERALS

1 Input apparatus
2 Entailment determination apparatus
3 Storage apparatus
4 utput apparatus
20 Predicate-argument structure analysis unit
21 Vector generation unit
22 Combination identification unit
23 Entailment determination unit
30 Word collation rule storage unit
31 Predicate-argument structure collation rule storage unit
110 Computer
111 CPU
112 Main memory
113 Storage apparatus
114 Input interface
115 Display controller
116 Data reader/writer
117 Communication interface
118 Input device
119 Display apparatus
120 Recording medium
121 Bus

The invention claimed is:

1. A textual entailment recognition apparatus for determining whether a first text entails a second text, comprising:
a vector generation unit that generates, for each of the first text and the second text, a vector for each predicate-argument structure of the first text and the second text by using a word other than a word indicating a type of argument of a predicate in the predicate-argument structure;
a combination identification unit that compares the vector generated for each predicate-argument structure for the first text and the vector generated for each predicate-argument structure for the second text, and identifies combinations of the predicate-argument structures of the first text and the predicate-argument structure of the second text based on a result of the comparison; and
an entailment determination unit that obtains a feature amount for each of the identified combinations, and determines whether the first text entails the second text based on the obtained feature amounts.

2. The textual entailment recognition apparatus according to claim 1,
wherein the predicate-argument structure includes a predicate included in the first text or the second text, a word serving as an argument of the predicate, and a word indicating the type of argument, and
the vector generation unit uses the predicate and the word serving as the argument of the predicate to generate the vector.

3. The textual entailment recognition apparatus according to claim 1,
wherein the combination identification unit calculates a similarity between the vector generated for each predicate-argument structure for the first text and the vector generated for each predicate-argument structure for the second text, and identifies combinations of the predicate-argument structures of the first text and the predicate-argument structure of second text based on the calculated similarities.

4. The textual entailment recognition apparatus according to claim 3,
wherein the combination identification unit performs normalization processing during calculation of the similarity, in accordance with an amount of information of the vector.

5. The textual entailment recognition apparatus according to claim 1,
wherein the entailment determination unit obtains, for each of the combinations, one of a degree of word coverage and a degree of word matching for only the word serving as the argument between the predicate-argument structure of the first text and the predicate-argument structure of the second text, as the feature amount, based on a word other than a word indicating the type of argument of a predicate in the predicate-argument structure.

6. The textual entailment recognition apparatus according to claim 5,
wherein the entailment determination unit uses, in addition to the feature amount, a structural feature of the predicate-argument structure to determine whether the first text entails the second text.

7. The textual entailment recognition apparatus according to claim 6,
wherein the entailment determination unit performs determination with preference to one of the feature amount and the structural feature of the predicate-argument structure, in accordance with a structural similarity between the predicate-argument structure of the first text and the predicate-argument structure of the second text.

8. The textual entailment recognition apparatus according to claim 5,
wherein the entailment determination unit adds a weight to the feature amount based on data obtained through machine learning, when obtaining the feature amount.

9. A textual entailment recognition method for determining whether a first text entails a second text, comprising the steps of:
(a) generating, by a computer, for each of the first text and the second text, a vector for each predicate-argument structure of the first text and the second text by using a word other than a word indicating the type of argument of a predicate in the predicate-argument structure;
(b) comparing, by the computer, the vector generated for each predicate-argument structure for the first text and the vector generated for each predicate-argument structure for the second text, and identifying, by the computer, combinations of the predicate-argument structures of the first text and the predicate-argument structure of the second text based on a result of the comparison; and
(c) obtaining, by the computer, a feature amount for each of the identified combinations, and determining, by the computer, whether the first text entails the second text based on the obtained feature amounts.

10. A computer-readable recording medium having recorded thereon a program for determining whether a first text entails a second text by a computer, the program including an instruction for causing the computer to execute the steps of:
(a) generating, for each of the first text and the second text, a vector for each predicate-argument structure of the first text and the second text by using a word other than a word indicating the type of argument of a predicate in the predicate-argument structure;
(b) comparing the vector generated for each predicate-argument structure for the first text and the vector generated for each predicate-argument structure for the second text, and identifying combinations of the predicate-argument structures of the first text and the predicate-argument structure of the second text based on a result of the comparison; and
(c) obtaining a feature amount for each of the identified combinations, and determining whether the first text entails the second text based on the obtained feature amounts.

11. The textual entailment recognition method according to claim 9,
wherein the predicate-argument structure includes a predicate included in the first text or the second text, a word serving as an argument of the predicate, and a word indicating the type of argument, and, in the step (a), the predicate and the word serving as the argument of the predicate are used to generate the vector.

12. The textual entailment recognition method according to claim 9,
wherein, in the step (b), a similarity between the vector generated for each predicate-argument structure for the first text and the vector generated for each predicate-argument structure for the second text is calculated, and combinations of the predicate-argument structures of the first text and the predicate-argument structure of second text based on the calculated similarities is identified.

13. The textual entailment recognition method according to claim 12,
wherein, in the step (b), normalization processing is performed during calculation of the similarity, in accordance with an amount of information of the vector.

14. The textual entailment recognition method according to claim 9,
wherein, in the step (c), for each of the combinations, one of a degree of word coverage and a degree of word matching for only the word serving as the argument between the predicate-argument structure of the first text and the predicate-argument structure of the second text is obtained, as the feature amount, based on a word other than a word indicating the type of argument of a predicate in the predicate-argument structure.

15. The textual entailment recognition method according to claim 14,
wherein, in the step (c), in addition to the feature amount, a structural feature of the predicate-argument structure is used to determine whether the first text entails the second text.

16. The textual entailment recognition method according to claim 15,
wherein, in the step (c), determination is performed with preference to one of the feature amount and the structural feature of the predicate-argument structure, in accordance with a structural similarity between the predicate-argument structure of the first text and the predicate-argument structure of the second text.

17. The textual entailment recognition method according to claim 14,
wherein, in the step (c), a weight is added to the feature amount based on data obtained through machine learning, when obtaining the feature amount.

18. The computer-readable recording medium according to claim 10,
wherein the predicate-argument structure includes a predicate included in the first text or the second text, a word serving as an argument of the predicate, and a word indicating the type of argument, and, in the step (a), the predicate and the word serving as the argument of the predicate are used to generate the vector.

19. The computer-readable recording medium according to claim 10,
wherein, in the step (b), a similarity between the vector generated for each predicate-argument structure for the first text and the vector generated for each predicate-argument structure for the second text is calculated, and combinations of the predicate-argument structures of the first text and the predicate-argument structure of second text based on the calculated similarities is identified.

20. The computer-readable recording medium according to claim 19,
wherein, in the step (b), normalization processing is performed during calculation of the similarity, in accordance with an amount of information of the vector.

21. The computer-readable recording medium according to claim 10,
wherein, in the step (c), for each of the combinations, one of a degree of word coverage and a degree of word matching for only the word serving as the argument between the predicate-argument structure of the first text and the predicate-argument structure of the second text is obtained, as the feature amount, based on a word other than a word indicating the type of argument of a predicate in the predicate-argument structure.

22. The computer-readable recording medium according to claim 21,
wherein, in the step (c), in addition to the feature amount, a structural feature of the predicate-argument structure is used to determine whether the first text entails the second text.

23. The computer-readable recording medium according to claim 22,
wherein, in the step (c), determination is performed with preference to one of the feature amount and the structural feature of the predicate-argument structure, in accordance with a structural similarity between the predicate-argument structure of the first text and the predicate-argument structure of the second text.

24. The computer-readable recording medium according to claim 21,
wherein, in the step (c), a weight is added to the feature amount based on data obtained through machine learning, when obtaining the feature amount.

* * * * *